(No Model.) 2 Sheets—Sheet 1.

J. BLAKEY.
MACHINE FOR CUTTING SOLES.

No. 392,255. Patented Nov. 6, 1888.

WITNESSES:
INVENTOR:
John Blakey
By his Attorneys, (No Model.) 2 Sheets—Sheet 2.

J. BLAKEY.
MACHINE FOR CUTTING SOLES.

No. 392,255. Patented Nov. 6, 1888.

WITNESSES:
Geo. Bainton,
C. B. Barber.

INVENTOR:
John Blakey
By his Attorneys,
Arthur C. Fraser & Co.

UNITED STATES PATENT OFFICE.

JOHN BLAKEY, OF LEEDS, ENGLAND.

MACHINE FOR CUTTING SOLES.

SPECIFICATION forming part of Letters Patent No. 392,255, dated November 6, 1888.

Application filed May 20, 1886. Serial No. 202,818. (No model.) Patented in England September 30, 1885, No. 11,636.

*To all whom it may concern:*

Be it known that I, JOHN BLAKEY, a subject of the Queen of Great Britain, residing in Leeds, England, have invented a certain new and useful Machine for Cutting Out the Soles of Boots or Shoes, of which the following is a specification.

The invention consists in improvements in the construction of the ordinary punching-machine, and is illustrated in the accompanying drawings, in which—

Figure 1:
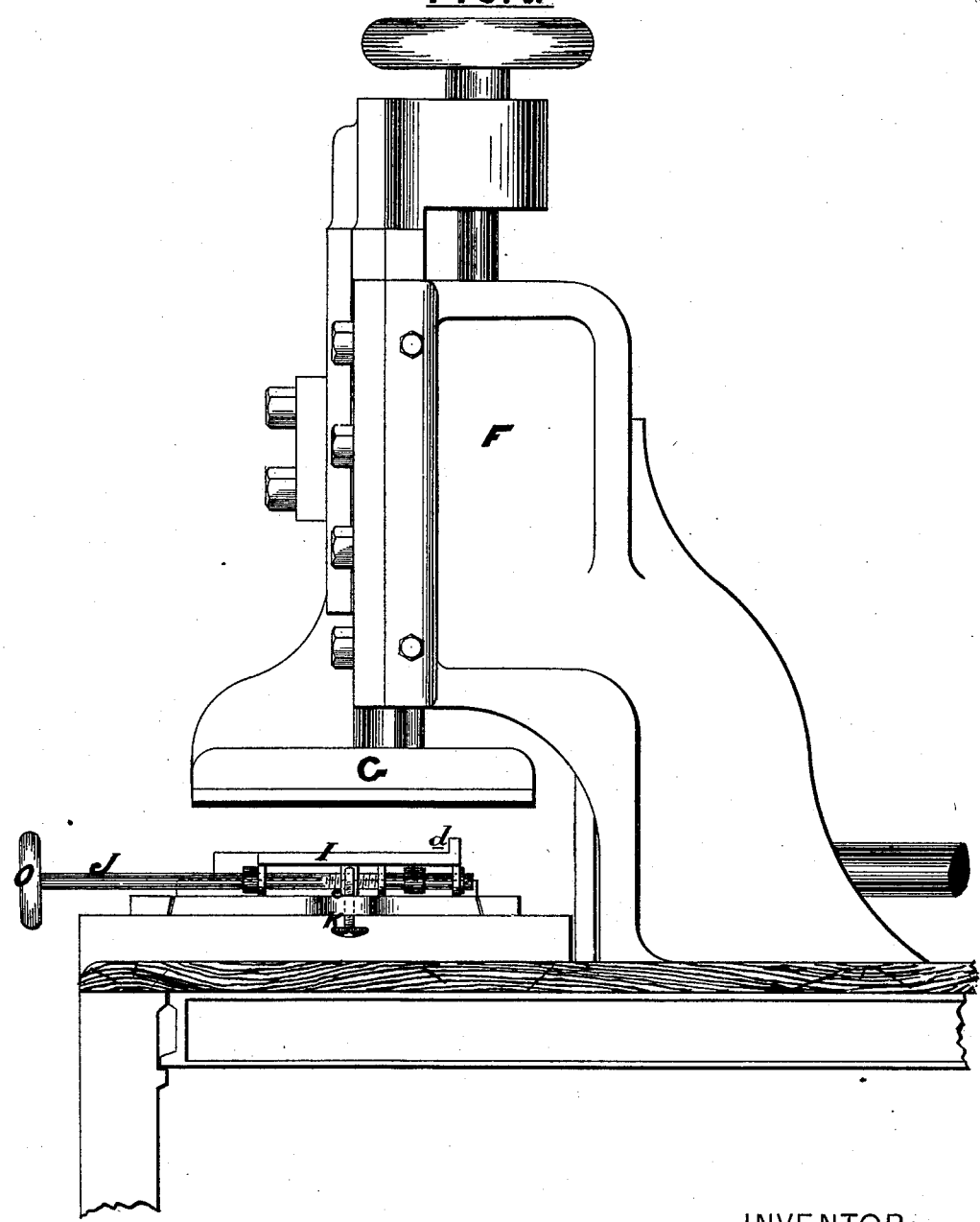
Figure 2:
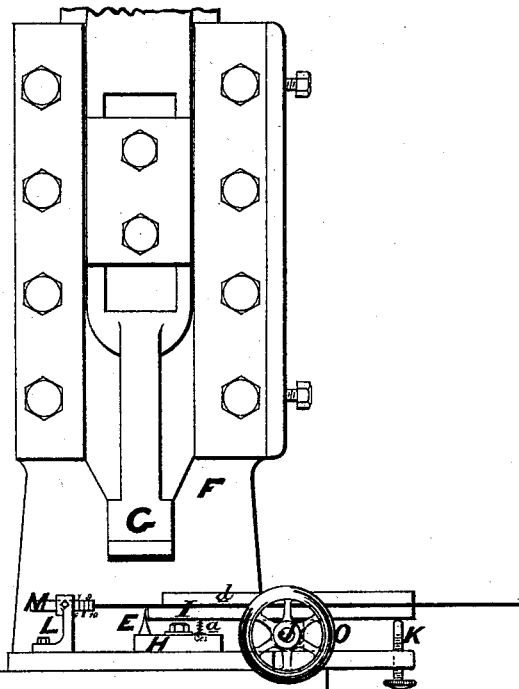
Figure 4:
Figure 4:
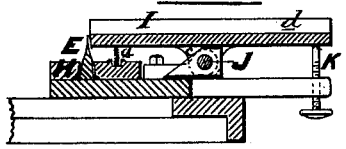
Figure 3:
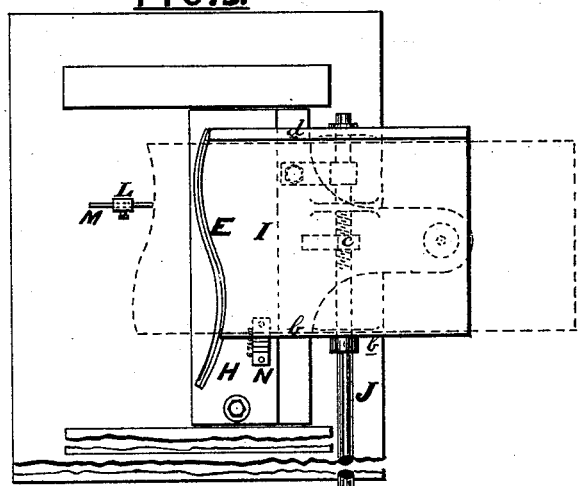

Figure 1 is a side view of so much of a punching-machine as is necessary to illustrate the improvements. Fig. 2 is a front view of the same. Fig. 3 is a plan view of the guide plate or table. Fig. 4 is a vertical section of the guide plate or table.

F is the standard of the punching-machine, and G the punch, having an upward and downward motion given to it by any ordinary means.

E is the knife, which is fastened securely in the plate H, (see section Fig. 4,) and I is a guide plate or table on which the range of leather is placed. This table is carried by a shaft, J, upon which it is capable of rocking, as hereinafter explained, by the pressure of the punch each time a sole is cut, a spiral spring, $a$, being employed to lift the table back again into a horizontal position. An adjusting-screw, K, is used for the purpose of adjusting the level of the table as the cutting-edge of the knife wears away.

The action of the machine is as follows: When commencing to cut out soles from a range of leather, the cutting-table is placed in proper position with the knife, according to the size of sole to be cut, and for that purpose an adjustable stop-piece is employed, composed of a gage, M, marked so as to represent the width of different sizes of soles, while a gage, N, is employed to determine the length of sole. If, therefore, soles for boots of size ten were to be cut, the gage M would be set to regulate the width, while the edge $b$ of the cutting-table I would be set to the gage N, which is graduated according to the lengths. The latter adjustment is effected by turning the hand-wheel O of the shaft J, which has a screw-thread formed on it working in a nut, $c$, which projects from the under side of the table, by which means the table can be moved backward and forward, according to the length of sole to be cut. After the table I and stop-piece M are adjusted in relation to each other a range of leather is placed upon the said table and its front edge is pushed against the stop-piece M, while its right-hand side is pushed against a ridge, $d$, projecting up from the cutting-table I. By this means the range of leather is kept in proper position for cutting. The punch then descends and forces the leather through the knife, the table I rocking upon the shaft J, so as to allow the knife to penetrate through the leather, as will be easily understood. The range of leather, which is perfectly parallel, is then turned over or reversed and another sole cut off, and so on until the leather is used up. Each time the leather is severed a sole for the right and left foot is alternately cut, while, in addition to the sole cut off, the range of leather is left with its edge properly curved to form one side of the next succeeding sole.

Instead of the table I rocking, it may be made to yield or sink at right angles to its plane, and the cutting-knife E may be fixed upon a central stud capable of oscillating, so as to alter the shape of sole so far as regards making it narrower at the toe.

I claim as my invention—

1. A machine for cutting shoe-soles, consisting of a punching-press, a reverse-curved knife fixed in place edge upward on the bed thereof, in combination with a yielding table for supporting the leather to be cut with its edge adjacent to said knife, said table being adjustable laterally on said bed and adapted to be depressed upon the descent of the platen, substantially as set forth.

2. A machine for cutting shoe soles, consisting of a punching-press, a reverse-curved knife fixed in place edge upward on the bed thereof, and a yielding table for supporting the leather to be cut with its edge adjacent to said knife, said table being adjustable laterally on said bed, and having a guide for directing the range of leather to said knife, in combination with a longitudinally-adjustable stop-piece for limiting the forward feed of the leather, and two scales, one to indicate the lateral adjustment of said yielding table, and the other to indicate the adjustment of the stop-piece, and graduated correspondingly in such manner, as described, that when both the table and stop-piece are adjusted to corresponding marks on the two scales the proper reciprocal adjustment for cutting any given size of soles is attained, as specified.

3. The combination of a punching-press, the knife E, fixed in place edge upward on the bed thereof, the tilting table I, and the screw J, on which said table is pivoted and by which it is laterally adjusted, substantially as specified.

4. The combination of a punching-press, the knife E, fixed in place edge upward on the bed thereof, the tilting table I, and the adjustable stop K for said table, substantially as specified.

In witness whereof I have hereunto signed my name in the presence of two subscribing witnesses.

JOHN BLAKEY.

Witnesses:
  A. B. CROSSLEY,
    *Commercial Street, Halifax.*
  JOSEPH STEAD,
    *Park Street, Halifax.*